(12) United States Patent
Chen

(10) Patent No.: US 7,365,116 B2
(45) Date of Patent: Apr. 29, 2008

(54) ARTICLES OF MANUFACTURE COMPRISING STIFF AND RESILIENT ETHYLENE COPOLYMER COMPOSITIONS

(75) Inventor: John Chu Chen, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 309 days.

(21) Appl. No.: 11/003,170

(22) Filed: Dec. 3, 2004

(65) Prior Publication Data

US 2005/0124741 A1 Jun. 9, 2005

Related U.S. Application Data

(60) Provisional application No. 60/526,900, filed on Dec. 3, 2003.

(51) Int. Cl.
*B32B 27/28* (2006.01)
(52) U.S. Cl. ............... 524/300; 524/315; 524/318; 524/322; 524/394; 524/398; 524/399; 524/400
(58) Field of Classification Search ............... 524/300, 524/315, 318, 322, 394, 398, 399, 400
See application file for complete search history.

(56) References Cited

U.S. PATENT DOCUMENTS 6,100,321 A * 8/2000 Chen .................. 524/400

| | | | |
|---|---|---|---|
| 6,653,382 B1 * | 11/2003 | Statz et al. ............. 524/400 |
| 2002/0091188 A1 | 7/2002 | Statz et al. | |
| 2003/0181260 A1 | 9/2003 | Rajagopalan et al. | |
| 2003/0181595 A1 | 9/2003 | Chen | |

FOREIGN PATENT DOCUMENTS

| JP | 09108007 A | 4/1997 |
|---|---|---|
| JP | 10120842 A | 5/1998 |
| JP | 3034614 B2 | 4/2000 |

OTHER PUBLICATIONS

PCT International Search Report for International application No. PCT/US2004/040570, dated Feb. 21, 2005.

* cited by examiner

*Primary Examiner*—Peter D. Mulcahy

(57) ABSTRACT

Disclosed are articles of manufacture comprising ionomeric copolymers blended with organic acids or salts thereof that have a unique combination of high stiffness and resilience. Articles of manufacture according the invention include, without limitation, footwear structural components (e.g., heel counters, toe puffs, and soles), golf club components, and industrial applications (e.g., materials such as caulking materials, sealants, modifiers for cement and asphalt, coatings, packaging films, molded parts, and resilient foams for sporting goods).

23 Claims, No Drawings

ARTICLES OF MANUFACTURE COMPRISING STIFF AND RESILIENT ETHYLENE COPOLYMER COMPOSITIONS

CROSS-REFERENCE TO RELATED APPLICATION

The present application claims priority under 35 U.S.C. § 120 to U.S. Provisional Appln. No. 60/526,900, filed on Dec. 3, 2003, which is incorporated herein by reference in its entirety.

BACKGROUND OF THE INVENTION

1. Field of the Invention

This invention relates to articles of manufacture comprising ionomeric ethylene copolymers blended with organic acids or salts of organic acids. The polymer blends are characterized by a unique combination of high resilience and stiffness. Articles of manufacture in which such properties are desirable include, without limitation, footwear structural components, golf club components, and industrial materials.

2. Description of Related Art

Several patents and publications are cited in this description in order to more fully describe the state of the art to which this invention pertains. The entire disclosure of each of these patents and publications is incorporated by reference herein.

Many articles of manufacture would benefit from a balance of properties including high resilience and stiffness. For example, footwear structural components such as heel counters, toe puffs, shanks, and soles provide shape support for footwear construction. A wide range of materials has been used to prepare these footwear components, including metal, leather, cardboard, laminated materials, foams, thermoplastic resins, and the like.

For the structural components of certain types of footwear, it would be useful to develop a material having a combination of stiffness and resilience, to provide improved shape support and crush resistance. Other desirable properties for footwear structural components include low density, low cost, adhesion to fabrics, and processing versatility, including improved heat stability and melt processibility. It is also desirable for such materials to be recyclable for economy and environmental compatibility.

As a result of their resilience, stiffness, toughness and durability, and because they are recyclable, various ionomeric resins sold by E. I. du Pont de Nemours and Company under the trademark Surlyn® and by the Exxon Corporation under the tradenames Escor™ and Iotek™ have become materials of choice for a number of applications, including the construction of certain footwear components.

In addition, some ionomer blends are known for use in footwear structural components. For example, JP10120842 describes an ionomeric composition comprising: (a) a partially neutralized ethylene acid copolymer having 5 to 30 wt % unsaturated carboxylic acid, melt flow rate of 0.1 to 100 g/10 min, and flexural modulus greater than 150 mPa; (b) a partially neutralized ethylene acid copolymer having 20 to 50 wt % unsaturated carboxylic acid, melt flow rate of 20 to 1000 g/10 min, and (c) reinforcing fiber.

JP3034614 describes an ionomeric composition comprising a blend of an ethylene acid copolymer neutralized from 10 to 80% and a polyester acid copolymer.

JP09108007 describes an ionomeric composition comprising an ethylene acid copolymer containing 17 to 30 wt % of (meth)acrylic acid neutralized from 5 to 40%.

Although certain conventional ionomers and blends, as described above, have proven suitable for use in footwear structural components, it would be useful to develop a material having a combination of higher stiffness and greater resilience than conventional ionomers. Such a material would provide improved shape support and crush resistance for footwear structural components and other applications.

It is particularly desirable to develop compositions of ethylene/acid copolymers with low to medium acid content that exhibit stiffness and resilience comparable to or exceeding that exhibited by conventional high acid ionomers. Such materials have use in many articles of manufacture, including, without limitation, footwear structural components, golf club components, and also in a wide variety of industrial materials, such as caulking materials, sealants, modifiers for cement and asphalt, coatings, packaging films, molded parts, and resilient foams for sporting goods.

SUMMARY OF THE INVENTION

Accordingly, the present invention provides articles of manufacture comprising ionomer compositions that are modified by the incorporation of organic acid salts. These organic acid modified ionomer compositions are stiffer and more resilient than typical unmodified ionomeric compositions, while advantageously providing good melt processibility and a favorable balance of mechanical properties.

More specifically, in a first aspect, this invention provides an article of manufacture, such as a footwear structural component, a golf club component, or an industrial material, that includes a melt-processible thermoplastic composition comprising:

(a) at least one ethylene/(meth)acrylic acid copolymer, or ionomer thereof, in which the (meth)acrylic acid content ranges from about 5 to about 30 wt % of the copolymer;

(b) from about 5 wt % to about 50 wt % based on total weight of components (a), (b) and (c) of one or more monocarboxylic organic acids having from 6 to 50 carbon atoms; and, optionally, (c) up to about 20 wt %, based on the total weight of components (a) and (c), of an E/X/Y copolymer, in which E is ethylene, X is a $C_3$ to $C_8$ $\alpha,\beta$-ethylenically unsaturated carboxylic acid, Y is a softening comonomer selected from alkyl acrylate and alkyl methacrylate wherein the alkyl groups have from one to eight carbon atoms, and further wherein the amount of X ranges from about 3 to about 30 wt % based on the weight of the E/X/Y copolymer, and the amount of Y ranges from about 5 to about 50 wt % based on the weight of the E/X/Y copolymer. Greater than 70% of all the combined carboxylic acid functionalities in (a), (b), and (c) when present are neutralized by one or more alkali metal, transition metal, or alkaline earth metal cations.

This invention also provides articles of manufacture wherein the melt-processible thermoplastic composition further comprises at least one nonionomeric thermoplastic resin.

DETAILED DESCRIPTION OF THE INVENTION

The following definitions apply to the terms as used throughout this specification, unless otherwise limited in specific instances.

The term "heel counter" as used herein refers to a stiff, curved piece that provides shape and structure to the heel area of a shoe.

The terms "toe puff" and "toe box" as used herein are synonymous and refer to a stiff, arched piece that provides shape and structure to the toe area of a shoe.

"Copolymer" means polymers containing two or more different monomers. The terms "dipolymer" and "terpolymer" mean polymers containing only two and three different monomers, respectively. The phrase "copolymer of various monomers" means a copolymer whose units are derived from the various monomers.

The term "(meth)acrylic acid" means methacrylic acid and/or acrylic acid. Likewise, the term "(meth)acrylate" means methacrylate and/or acrylate.

The term "ionomer" as used herein, alone or in derivative form, such as "ionomeric", e.g., refers to an acid copolymer that has been at least partially neutralized with a neutralizing agent such as an inorganic base, and that comprises carboxylate salts with counterions derived from the neutralizing agent.

The term "acid", as used herein with reference to organic acids, e.g., "fatty acid" and "stearic acid", refers to an acid, a salt of the acid, or a mixture of the acid and one or more of its salts. Thus, an organic acid, as the term is used herein, may have carboxylic acid functionality (—C(O)OH), carboxylate functionality (—C(O)O$^-$), or both carboxylic acid and carboxylate functionality.

Thermoplastic compositions are polymeric materials that can flow when heated under pressure. Melt index (MI) is the rate of flow of a polymer through a specified orifice under controlled conditions of temperature and pressure. Melt indices reported herein are determined according to ASTM 1238 at 190° C. using a 2160 g weight, with values of MI reported in grams/10 minutes.

The terms "finite amount" and "finite value", as used herein, refer to an amount or value that is not equal to zero.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The present invention provides articles of manufacture comprising a melt-processible thermoplastic composition. Examples of articles of manufacture according to the invention include footwear structural components (e.g., heel counters, toe puffs, and soles), golf club components, and industrial materials (e.g., materials such as caulking materials, sealants, modifiers for cement and asphalt, coatings, packaging films, molded parts, and resilient foams for sporting goods).

The melt-processible thermoplastic composition comprises at least one ethylene/(meth)acrylic acid copolymer, or an ionomer thereof. Ethylene/(meth)acrylic acid (E/(M)AA) copolymers useful in this invention include dipolymers having from about 5 to about 30 wt % (M)AA, preferably having from about 10 to about 25 wt % (M)AA, and more preferably having from about 12 to about 20 weight % (M)AA, based on the total weight of the dipolymer. The E/(M)AA copolymer(s) are preferably "direct" acid copolymers, and, also preferably, they are at least partially neutralized, as described in detail below.

When neutralized, the E/(M)AA copolymers useful in this invention preferably have melt indices ranging from about 0.3 to about 30. Of note are resins having melt indices ranging from about 0.7 to about 15.

The melt-processible thermoplastic composition also includes at least one organic acid. The organic acids that may be employed in the present invention are preferably non-volatile and non-migratory. Suitable organic acids include aliphatic moieties that may have straight chain or branched structures, aromatic moieties, ethylenically unsaturated moieties, or any combination of these moieties. Preferably, the organic acid includes from 6 to 50 carbon atoms. Also preferably, the organic acid is a monocarboxylic acid. Of particular note are organic acids that are crystalline or crystallizable at temperatures above room temperature.

Fatty acids or fatty acid salts are preferred, particularly saturated, aliphatic, mono-functional organic acids having from 6 to 36 carbon atoms. More preferred are saturated, aliphatic, mono-functional organic acids having from 6 to 22 carbon atoms. Acids that are particularly useful in the present invention include caproic acid, caprylic acid, capric acid, palmitic acid, myristic acid, lauric acid, eicosanoic acid, stearic acid, behenic acid, benzoic acid, and phenylacetic acid. More preferred are organic acids selected from the group consisting of stearic acid, palmitic acid, myristic acid, behenic acid, benzoic acid, and phenylacetic acid. Stearic acid is particularly preferred.

The organic acid(s) are present in an amount sufficient to enhance the stiffness and/or resilience properties of the copolymer over the unmodified copolymer. The organic acid(s) are preferably present in an amount of at least about 5 wt % up to about 50 wt %, based on the total weight of the thermoplastic composition. More preferably, the organic acid(s) are added in an amount of at least about 15 wt %. Of note are thermoplastic compositions in which the organic acid(s) are added in an 30 amount of at least about 25 wt %.

Preferably, the organic acids are at least partially neutralized to salt form when they are added to the polymer blend. When added in salt form, the organic acid(s) are preferably neutralized with sodium, calcium, lithium, magnesium, zinc, or a combination of two or more of these cations. More preferred cations include sodium, lithium, calcium, or a combination of two or more of these cations. Sodium is a particularly preferred cation, and sodium stearate is a particularly preferred salt of an organic acid.

The melt-processible thermoplastic composition may optionally include at least one ethylene acid copolymer (c) containing a third "softening" monomer that disrupts the crystallinity of the polymer. These acid copolymers can be described as E/X/Y copolymers wherein E is ethylene, X is an $\alpha,\beta$ ethylenically unsaturated carboxylic acid, such as (meth)acrylic acid, and Y is the softening comonomer. Preferred softening comonomers are $C_1$ to $C_8$ alkyl (meth) acrylate esters. Preferably, X is present in an amount of about 3 wt % to about 35 wt % of the E/X/Y copolymer and Y is present in an amount of about 5 wt % to about 50 wt % of the E/X/Y copolymer. Also preferably, the acid functionalities of the X comonomer are at least partially neutralized, as described in detail below.

The E/X/Y copolymer(s) may be made by any method known in the art. Suitable E/X/Y copolymers include ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth)acrylic acid/ethyl (meth)acrylate terpolymers, and the like.

The E/X/Y copolymer, when used, may be present in a finite amount up to about 20 wt %, and more preferably in an amount ranging from about 5 wt % to about 20 wt %, based on the total weight of components (a) and (c).

Optionally, compositions of this invention may further comprise additional nonionomeric thermoplastic resins as desired to modify the properties of the compositions. For example, thermoplastic polymer components selected from the group consisting of polyamides, polyesters, polystyrene, acrylics and polycarbonate may be used to impart improved thermal resistance to the compositions. Other polymer components, such as thermoplastic elastomers, may be used as tougheners.

Suitable nonionomeric thermoplastic resins include, for example, thermoplastic elastomers, such as polyurethanes; polyetheresters; polyamide ethers; polyether ureas; HYTREL® polyester elastomer, available from E.I. du Pont de Nemours and Company of Wilmington, Del.; PEBAX™ block copolymers based on polyether-block-amide, available from Atofina Chemicals, Inc., of Philadelphia, Pa.; styrene-butadiene-styrene (SBS) block copolymers; styrene (ethylene-butylene)-styrene block copolymers; polyurethanes; methylcellulose; 4,6-nylon; 6-nylon; polyamides in general (oligomeric and polymeric); polyesters; polyvinyl alcohol; polyolefins including polyethylene, polypropylene, and ethylene/propylene copolymers; metallocene catalyzed polyolefins, ethylene copolymers with various comonomers, such as ethylene/vinyl acetate, ethylene/(meth)acrylates, ethylene/(meth)acrylic acid, ethylene/epoxy-functionalized monomer, ethylene/CO; metallocene catalyzed ethylene and its copolymers with, e.g., polyvinyl alcohol or polyacrylate; ethylene/vinyl alcohol copolymers, such as ELVAL™, available from Kuraray Co., Ltd., of Tokyo, Japan; functionalized polymers with grafted maleic anhydride functionality and epoxidized polymers; elastomers, such as ethylene propylene diene monomer (EPDM); metallocene catalyzed polyethylene and its copolymers; ground up powders of the thermoset elastomers; and the like. The melt-processible thermoplastic composition may include two or more of any of these materials.

The additional thermoplastic polymer components can be present in the melt-processible thermoplastic composition in amounts less than 50 wt %, preferably less than 30 wt %, alternatively less than 15 wt % based on the total weight of the E/(M)AA copolymer, organic acid, and E/X/Y copolymer blend.

Also optionally, the melt-processible thermoplastic blend may include one or more fillers. The filler(s) enhance the mechanical properties of the polymer blend. Therefore, the selection of a particular filler is dependent upon the properties desired for the end use application, i.e., footwear component or caulking material. Criteria for selecting fillers and methods of incorporating fillers into polymer compositions are known to those of skill in the art. See, e.g., *Modern Plastics Encyclopedia*, McGraw-Hill, New York, N.Y. 1995. In general, fillers such as mica, organic or inorganic chopped fibers, fibrils, pulps, etc. may be used, as well as the other well-known fillers used in thermoplastic compositions. It is preferred that the filler materials be non-reactive or essentially non-reactive. The filler(s) may be present in an amount up to 170 parts by weight of one or more fillers, based on 100 parts by weight of the melt-processible thermoplastic polymer blend.

Various other additives may be present in the compositions described herein, provided their presence does not substantially alter the properties of high stiffness and resilience. For example, antioxidants and thermal stabilizers, ultraviolet (UV) light stabilizers, pigments and dyes, fillers, anti-slip agents, plasticizers, other processing aids, and the like may be advantageously employed. Suitable levels of these additives and methods of incorporating these additives into polymer compositions are known to those of skill in the art. See, e.g., *Modern Plastics Encyclopedia*.

The melt-processible thermoplastic compositions described herein are at least partially neutralized by one or more neutralizing agents that are typically chemical bases. The carboxylic acid groups of the E/MAA dipolymer, the organic acid, and the E/X/Y copolymer (when present) in the thermoplastic composition, once neutralized, become carboxylate groups associated with counterions that are cations derived from the neutralizing agent(s). Preferably, greater than 70%, alternatively greater than 80%, alternatively greater than 90%, and alternatively 100% of all the acid functionalities present in the melt-processible thermoplastic composition are neutralized.

Preferably, the melt-processible thermoplastic composition comprises an alkali metal, alkaline earth metal, or transition metal cation. Preferred compositions include one or more of lithium, sodium, potassium, magnesium, calcium, barium, lead, tin, or zinc. More preferred compositions include one or more of sodium, calcium, lithium, magnesium, or zinc. Sodium is a particularly preferred cation.

The components of the melt-processible thermoplastic composition may be combined by any means known in the art. Typically, the components of the polymer blend are melt blended with each other under high shear. The components may first be combined with one another in a "salt and pepper" blend, i.e., a pellet blend of each of the ingredients, or they may be combined with one another via simultaneous or separate metering of the various components, or they may be divided and blended in one or more passes into one or more sections of mixing equipment such as an extruder, Banbury, Buss Kneader, Farrell continuous mixer, or other mixing equipment. For example, an extruder with two or more feed zones into which one or more of the ingredients may be added sequentially can be used.

Melt blending is a preferred method of combining the components of the thermoplastic composition. For example, in the hopper of a Werner & Pfleiderer (W&P) twin-screw extruder, a pellet blend may be made comprising stoichiometric amounts of the organic acid, the E/MAA copolymer or ionomer, and a neutralizing agent, if necessary. The pellet blend is melt-mixed W&P twin-screw extruder in the presence of added water to promote neutralization.

In this connection, the acidic components of the melt-processible thermoplastic composition may be added to the polymer blend in the acid form, the salt form, or as a mixture of acid(s) and salt(s). It will be apparent to those of skill in the art that, with the high temperatures and shear rates of extruder processing, or over longer time periods in milder conditions, there will be equilibration, to some extent, between the level of neutralization of the organic acid, and the level of neutralization of the acid copolymer(s).

Thus, depending on the overall level of neutralization that is desired for the blend, it is possible to over neutralize the acid copolymer, provided that the ionomer remains melt processible, and back titrate by adding the organic acid in its acid form. Conversely, it is possible to add the organic acid, completely neutralized, to an acid copolymer whose level of neutralization is below that which is desired for the polymer blend. Also, the neutralization of the acid copolymer and that of the organic acid can each be adjusted, before blending, to be equal to the desired final level of the melt-processible thermoplastic composition. Those of skill in the art recognize that other permutations are possible, and are able to determine which methods may be desirable under particular circumstances.

Those of skill in the art are also aware that a desired balance of cations can be achieved using similar principals and methods. For example, an organic acid in the form of its sodium salt may be directly blended with an acid copolymer to produce a desired melt-processible thermoplastic composition. Further neutralization, if necessary or desirable, may be provided by adding one or more additional neutralizing agents, such as potassium hydroxide or the like, to the polymer blend. Alternatively, an acid copolymer may be neutralized with a blend of salts of one or more organic acids, the ratio of those cations corresponding stoichiometrically to the ratio that is desired in the ionomer. Also, an ionomer including one cation may be blended with one or more salts of organic acids that comprise one or more different cations. Over neutralization, if any, may be corrected by back titration with an acid. In these instances, assuming typical melt blending and extruder processing methods are used, it is expected that the concentrations of the cations will be uniform throughout the bulk of the polymer blend. Again, those of skill in the art recognize that other permutations are possible, and are able to determine which methods of manipulating the cation levels may be desirable under a particular set of circumstances.

The stiff and resilient organic acid modified ionomer compositions described herein are useful substitutes for, or adjuncts to, one or more materials taught in the art at the levels taught in the art for use in a wide range of manufactured articles. The articles of manufacture provided by the present invention may be prepared by any suitable means known in the art to fabricate objects including a melt-processible polymer composition.

Preferably, footwear structural components are formed by injection- or compression-molding an extrudate of the thermoplastic blends described above into the desired shape. Thermal forming can also be employed to prepare footwear structural components of the desired shape. For example, in one type of injection molding, the composition is injected into a mold for a period of time at a mold temperature from about 50° F. to 100° F. to form a molded part of the final desired shape. In compression molding, the composition is formed via injection molding or sheet extrusion at e.g. about 380° F. to about 450° F. into preshaped blanks that are subjected to compression molding at e.g. 200° F. to 400° F. under pressure for a brief period of time followed by cooling at 50° F. to 70° F. to form a molded part of the final desired shape.

Articles of manufacture according to the invention include other sporting equipment applications, particularly golf shoe cleats, various components of golf clubs such as golf club face plates or inserts, molded golf club heads, club head coatings or casings, and fillers for inner cavity of a golf club head, and the like. The melt-processible thermoplastic compositions can be used together with or in place of materials taught in the art for use in club faces such as poly-imides reinforced with fillers or fibers, methyl (meth) acrylate copolymers, carbon-fiber reinforced polycarbonate, materials based on PM(M)A and crosslinkable monomers, and cross-linked synthetic rubber. They can also be substituted for or used in conjunction with the cured acrylic monomer, oligomer, polymer used to impregnate wood club heads, for rubber-like elastic cores in club heads, and for molded polyurethane club heads. They may also be used in resilient foams for sporting goods.

The melt-processible thermoplastic compositions are also useful in various industrial applications such as, e.g., caulking materials, sealants, modifiers for cement and asphalt, and coatings. The compositions may also be used in packaging films and various molded parts not described above. These articles of manufacture may be made by any means known in the art. For example, after mixing the components of the melt-processible thermoplastic composition in an extruder, the melt-processible thermoplastic composition is a melt that may be shaped by injection molding, casting, melt extrusion, flat die extrusion, lamination, calendering, protrusion, or any other technique that will produce the desired shape. See, e.g., the *Modern Plastics Encyclopedia; Paint Flow and Pigment Dispersion*, 2d edition, Temple C. Patton (John Wiley & Sons, 1979); and the *Wiley Encyclopedia of Packaging Technology*, 2d edition, A. L. Brody and K. S. Marsh, Eds., Wiley-Interscience (Hoboken, 1997).

See also, for examples of materials and applications, particularly pertaining to golf equipment, U.S. Pat. No. 3,836,153; U.S. Pat. No. 4,326,716; U.S. Pat. No. 4,504,520; U.S. Pat. No. 5,078,398; U.S. Pat. No. 6,146,571; EP 737,493B; FR 2523854A; GB 2132092B; JP 02124182A; JP 04144704A; JP 04002375A; JP 09225076A; JP 57203460A; JP 59194802A; JP 62224382A; JP 3302407B; JP 92015702B; WO 2002004694; and WO 2002010470.

The compositions described herein preferably have a flex modulus greater than 70 kpsi, alternatively greater than 80 kpsi, alternatively greater than 90 kpsi, alternatively greater than 100 kpsi, alternatively greater than 110 kpsi, and alternatively greater than 120 kpsi. Of note are compositions having flex modulus greater than 150 kpsi, alternatively greater than 170 kpsi, and alternatively greater than 180 kpsi.

The following examples are provided to describe the invention in further detail. These examples, which set forth a preferred mode presently contemplated for carrying out the invention, are intended to illustrate and not to limit the invention.

EXAMPLES AND COMPARATIVE EXAMPLES

Materials Used

Non-neutralized ethylene/(meth)acrylic acid copolymers are commercially available from DuPont under the trade name Nucrel®. Ionomer resins are commercially available from DuPont under the trade name Surlyn® (see the description of Ionomers A through H below for representative ionomer resins). The ionomers used in the Examples are derived from ethylene/(meth)acrylic acid copolymers with either 15 weight % or 19 weight % methacrylic acid that have melt indices (MI) of about 60. The ethylene/(meth) acrylic acid copolymers are neutralized under standard conditions to provide the ionomer resins that have melt indices of about 0.7 to about 3. Ionomer resins used in the Examples are identified in Table 1. In Table 1, E represents ethylene, MAA represents methacrylic acid, the number % represents the weight % of monocarboxylic acid comonomer present in the copolymer, with the neutralization level indicated in % of the available carboxylic acid moieties neutralized and the atomic symbol representing the neutralizing cation. For example, Resin A is a copolymer of 85% ethylene and 15% methacrylic acid having a melt index of 0.93. Also, 59% of the acid groups in Resin A are neutralized with sodium atoms.

TABLE 1

Ionomer Resins

A: E/15% MAA, 59% neut. w. Na, with MI of 0.93
B: E/19% MAA, 37% neut. w. Na, with MI of 2.6
C: E/15% MAA, 47% neut. w. Li, with MI of 2.6.
D: E/15% MAA, 52% neut. w. Li, with MI of 1.8
E: E/19% MAA, 36% neut. w. Zn, with MI of 1.3
F: E/19% MAA, 40% neut. w. Mg, with MI of 1.1
G: E/19% MAA, 45% neut. w. Li, with MI of 1.1
H: E/15% MAA, 58% neut. w. Zn, With MI of 0.7

Stiff ionomer compositions useful in this invention were prepared as described below to provide Examples 1 through 12, reported in Table 2 (amounts of the components listed in Table 2 are wt % based on total composition weight). Comparative Examples are the ionomers or blends without the organic acid salt modifier, prepared and injection molded in similar fashion. They are numbered to correspond to the Example compositions used in the invention (e.g. Example 1 uses the same ionomer resin as Comparative Example C1 with the addition of the modifiers indicated). In Table 2, "- -" indicates that a component is not present in the composition.

TABLE 2

Composition, weight %

| Example | Resin | Ionomer resin | Sodium Stearate | Base concentrate* |
|---|---|---|---|---|
| 1 | A | 58.1 | 38.8 | 3.1 |
| C1 | A | 100 | — | — |
| 2 | B | 55.9 | 37.2 | 6.9 |
| C2 | B | 100 | — | — |
| 3 | B | 73.44 | 18.4 | 8.16 |
| 4 | B | 65.07 | 27.7 | 7.23 |
| 5 | B | 56.43 | 37.3 | 6.27 |
| 6 | A | 76.53 | 19.1 | 4.37 |
| 7 | A | 67.45 | 28.8 | 3.85 |
| 8 | A | 58.10 | 38.6 | 3.30 |

| | Resin | Ionomer resin | Sodium stearate | Calcium stearate |
|---|---|---|---|---|
| 9 | B | 60 | 15 | 25 |
| 10 | E | 60 | 15 | 25 |
| 11 | A | 60 | 15 | 25 |
| 12 | H | 60 | 15 | 25 |

*The base concentrate is a blend of 59.5 weight % sodium carbonate in an E/MAA carrier resin.

Compositions were prepared by melt blending the ionomer resins, the organic acid salt modifier (i.e., sodium stearate) and the base concentrate employing a Werner & Pfleiderer twin-screw extruder. After melt blending in the twin screws extruder, the compositions were injection molded into the appropriate shapes for mechanical property testing. After two weeks of annealing at ambient temperature (approximately 23° C. to 25° C.), the Shore D hardness and the flex modulus were measured as described below and are reported in Table 3. Differential Scanning Calorimetry (DSC) analysis, in accord with ASTM D-3418, was used to characterize the melting point ($T_m$), secondary melting point ($T_{m2}$), and total crystallinity, as measured by the total heat of fusion ($H_f$), also reported in Table 3. More specifically, the melt Index (MI) was measured in accord with ASTM D-1238, condition E, at 190° C., using a 2160-gram weight, with values of MI reported in grams/10 minutes. The Shore D hardness was measured in accord with ASTM D-2240 and the flex modulus of the compositions was determined using ASTM method D790.

TABLE 3

Mechanical Properties

| | Shore D | Flex | DSC Analysis | | |
|---|---|---|---|---|---|
| Example | hardness | Modulus, Kpsi | $T_m$, °C. | $T_{m2}$, °C. | $H_f$, J/g |
| 1 | 63 | 162 | 129 | 103 | 73 |
| C1 | 66 | 47 | 93 | 55 | 65 |
| 2 | 67 | 182 | 127 | 117 | 70 |
| C2 | 69 | 67 | 88 | 76 | 55 |
| 3 | 68.1 | 74.7 | NA* | NA | NA |
| 4 | 68.3 | 110 | NA | NA | NA |
| 5 | 68.6 | 159 | NA | NA | NA |
| 6 | 66.0 | 72.9 | NA | NA | NA |
| 7 | 66.3 | 126 | NA | NA | NA |
| 8 | 65.0 | 211 | NA | NA | NA |

*"NA" means "not available."

Inspection of the data presented in Table 3 shows that modification of an ionomer derived from an ethylene acid copolymer by the addition of organic acid salts provides a significantly higher flex modulus than the corresponding nonmodified ionomer. These modified compositions exhibit flex moduli of at least 72.9 kpsi and up to 211 kpsi.

The increased stiffness of the organic acid salt modified compositions described herein, as evidenced by their increased flex modulus, makes these compositions particularly desirable for preparing footwear structural components and other industrial materials.

While certain of the preferred embodiments of the present invention have been described and specifically exemplified above, it is not intended that the invention be limited to such embodiments. Various modifications may be made without departing from the scope and spirit of the present invention, as set forth in the following claims.

What is claimed is:

1. An article of manufacture comprising a melt-processible thermoplastic composition consisting essentially of:
    (a) at least one ethylene/(meth)acrylic acid copolymer, or an ionomer thereof, in which the (meth)acrylic acid content ranges from about 5 to about 30 wt % of the copolymer; and
    (b) from about 5 wt % to about 50 wt % based on total weight of (a), (b) and (c) of one or more monocarboxylic organic acids having from 6 to 50 carbon atoms;
    wherein greater than 70% of all the combined carboxylic acid functionalities in (a) and (b) are neutralized by one or more alkali metal, transition metal, or alkaline earth metal cations; and
    wherein the melt-processible thermoplastic composition has a flex modulus greater than 70 kpsi.

2. The article of manufacture of claim 1 wherein greater than 80% of all the acid functionalities in the composition are neutralized.

3. The article of manufacture of claim 2 wherein greater than 90% of all the acid functionalities present in the composition are neutralized.

4. The article of manufacture of claim 1 wherein the (meth)acrylic acid content of the copolymer of component (a) ranges from about 10 wt % to about 25 wt % of the copolymer.

5. The article of manufacture of claim 4 wherein the (meth)acrylic acid content of the copolymer of component (a) ranges from about 12 wt % to about 20 wt % of the copolymer.

6. The article of manufacture of claim 1 wherein component (b) is present in an amount of at least about 15 wt % based on the total weight of the melt-processible thermoplastic composition.

7. The article of manufacture of claim 6 wherein component (b) is present in an amount of at least about 25 wt % based on the total weight of the melt-processible thermoplastic composition.

8. The article of manufacture of claim 1 wherein the at least 70% of the combined carboxylic acid functionalities in the melt-processible thermoplastic composition are neutralized by sodium, calcium, lithium, magnesium, zinc or a mixture of at least two of these cations.

9. The article of manufacture of claim 1 wherein component (b) comprises a saturated, aliphatic, monocarboxylic organic acid having from 6 to 36 carbon atoms or a salt thereof.

10. The article of manufacture of claim 9 wherein component (b) comprises a saturated, aliphatic, monocarboxylic organic acid having from 6 to 22 carbon atoms or a salt thereof.

11. The article of manufacture of claim 9 wherein component (b) comprises at least one organic acid selected from the group consisting of stearic acid, palmitic acid, myristic acid, benzoic acid, phenylacetic acid, and behenic acid, and the salts thereof.

12. The article of manufacture of claim 11 wherein component (b) comprises a sodium salt of the at least one organic acid.

13. The article of manufacture of claim 11 wherein component (b) comprises stearic acid or sodium stearate.

14. The article of manufacture of claim 1 wherein the composition has a flex modulus greater than 100 kpsi.

15. The article of manufacture of claim 1 wherein the composition has a flex modulus greater than 150 kpsi.

16. The article of manufacture of claim 1 wherein the composition further comprises at least one additional non-ionomeric thermoplastic resin selected from the group consisting of polyurethane; polyurea; polyamide; polyester; polycarbonate; polystyrene; acrylics; copoly-ether-ester; copoly-ether-amide; copoly-ether-urethane; copoly-ether-urea; polyolefins; elastomeric polyolefins; polyethylene; polypropylene; ethylene copolymers derived from copolymerization of ethylene and polar comonomers selected from the group consisting of vinyl acetate, (meth)acrylate, carbon monoxide, and epoxy containing comonomers; maleic anhydride modified polymers; and thermoplastic elastomers based on styrene-butadiene block copolymers.

17. The article of manufacture of claim 1, being a footwear structural component.

18. The footwear structural component of claim 17 being a heel counter, a toe puff, a shank, or a sole.

19. The article of manufacture of claim 1, being a golf club component.

20. The golf club component of claim 19, being a face plate, an insert, a molded golf club head, a club head coating or casing, or a filler for the inner cavity of a golf club head.

21. The article of manufacture of claim 1, being an industrial material.

22. The industrial material of claim 21, being a caulking material, a sealant, a modifier for cement and asphalt, a coating, a packaging film, a molded part, or a resilient foam.

23. The industrial material of claim 22, wherein the molded part is a golf shoe cleat.

\* \* \* \* \*